(12) United States Patent
Wei et al.

(10) Patent No.: US 11,658,292 B2
(45) Date of Patent: May 23, 2023

(54) SILICON-BASED ANODE MATERIAL AND PREPARATION METHOD THEREOF, LITHIUM ION BATTERY

(71) Applicant: SHANGHAI SHANSHAN TECH CO., LTD., Shanghai (CN)

(72) Inventors: Liangqin Wei, Shanghai (CN); Fei Ma, Shanghai (CN); Dongdong Liu, Shanghai (CN); Yuhu Wu, Shanghai (CN); Zhihong Wu, Shanghai (CN); Xiaoyang Ding, Shanghai (CN); Fengfeng Li, Shanghai (CN)

(73) Assignee: SHANGHAI SHANSHAN TECH CO., LTD., Shanghai (CN)

( * ) Notice: Subject to any disclaimer, the term of this patent is extended or adjusted under 35 U.S.C. 154(b) by 0 days.

(21) Appl. No.: 16/954,513

(22) PCT Filed: Dec. 30, 2019

(86) PCT No.: PCT/CN2019/129889
§ 371 (c)(1),
(2) Date: Jun. 16, 2020

(87) PCT Pub. No.: WO2021/134198
PCT Pub. Date: Jul. 8, 2021

(65) Prior Publication Data
US 2022/0328806 A1    Oct. 13, 2022

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0428* (2013.01); *H01M 4/134* (2013.01);
(Continued)

(58) Field of Classification Search
CPC .... H01M 4/366; H01M 4/0428; H01M 4/134; H01M 4/386; H01M 4/625; H01M 10/0525
See application file for complete search history.

(56) References Cited

U.S. PATENT DOCUMENTS

2018/0145316 A1    5/2018 Moon et al.

FOREIGN PATENT DOCUMENTS

| CN | 101153384 A | | 4/2008 |
|---|---|---|---|
| CN | 101215182 | * | 7/2008 |

(Continued)

OTHER PUBLICATIONS

Feng Xuejiao, Yang Jun, Nuli Yanna, Wang Jiulin: "Synthesis and Lithium Storage Performance of Porous Silicon/Carbon Composite Material from SiCl4" in: "Chinese Journal of Inorganic Chemistry", Nov. 10, 2013 (Nov. 10, 2013), vol. 29 No. 11.

(Continued)

*Primary Examiner* — Jayne L Mershon
(74) *Attorney, Agent, or Firm* — Fideli Law PLLC

(57) ABSTRACT

A silicon-based anode material, a preparation method thereof and a lithium ion battery are provided. The preparation method of the silicon-based anode material includes: passing a silicon substrate material through a vapor deposition gas to coat the surface of the silicon substrate material with a carbon deposition layer, the vapor deposition gas includes a first carbon source gas and a second carbon source gas, the volume percentage of the first carbon source gas and the second carbon source gas in the vapor deposition gas increases or decreases at different reaction stages for forming the carbon deposition layer. The side of the carbon deposited layer close to the silicon base material is more or less dense than the other side of the carbon deposited layer. The coating layer on the surface of the silicon-based anode (Continued)

material has a continuously changing junction, thereby greatly improving the cycling stability of the material.

13 Claims, 1 Drawing Sheet

(51) Int. Cl.
  *H01M 4/134*  (2010.01)
  *H01M 4/38*  (2006.01)
  *H01M 4/62*  (2006.01)
  *H01M 10/0525*  (2010.01)
  *H01M 4/02*  (2006.01)

(52) U.S. Cl.
  CPC ........... *H01M 4/386* (2013.01); *H01M 4/625* (2013.01); *H01M 10/0525* (2013.01); *H01M 2004/021* (2013.01); *H01M 2004/027* (2013.01)

(56) References Cited

FOREIGN PATENT DOCUMENTS

| | | |
|---|---|---|
| CN | 101215182 A | 7/2008 |
| CN | 103390750 A | 11/2013 |
| CN | 103700819 A | 4/2014 |
| CN | 104488126 A | 4/2015 |
| CN | 105742613 A | 7/2016 |
| CN | 107293719 A | 10/2017 |
| CN | 107845785 A | 3/2018 |
| CN | 108075117 A | 5/2018 |
| CN | 109994717 A | 7/2019 |
| CN | 110085856  * | 8/2019 |
| CN | 110085856 A | 8/2019 |
| CN | 110380029 A | 10/2019 |
| CN | 110400930 A | 11/2019 |
| JP | 2018081923 A | 5/2018 |
| KR | 20160122937 A | 10/2016 |

OTHER PUBLICATIONS

Liu Bonan, Xu Quan, Chu Geng, Lu Hao, Yin Yaxia, Luo Fei, Zheng Jieyun, Guo Yuguo, Li Hong: "Research progress on the nano-Si/C materials with high capacity for lithium-iom battery" in: "Energy Storage Science and Technology", Jun. 29, 2016 (Jun. 29, 2016), vol. 5 No.4.

Notification of Second Office Action (in China), dated Feb. 15, 2023.

* cited by examiner

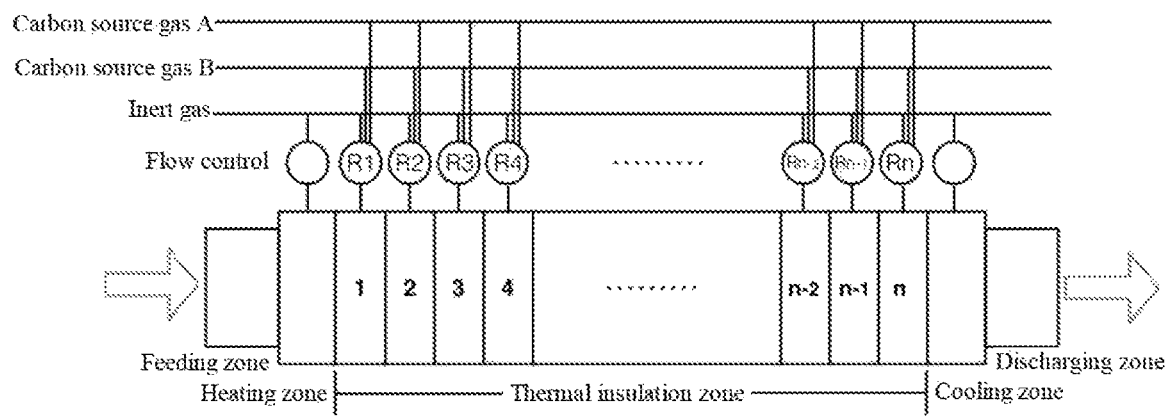

SILICON-BASED ANODE MATERIAL AND PREPARATION METHOD THEREOF, LITHIUM ION BATTERY

This application is a national stage application of PCT application No. PCT/CN2019/129889, filed on Dec. 30, 2019, and the contents of which are incorporated herein by reference in their entirety.

TECHNICAL FIELD

The present application relates to the field lithium-ion battery materials, in particular to silicon-based anode materials, preparation methods thereof, and lithium-ion batteries.

BACKGROUND

Commercial lithium ion batteries mainly use graphite as their anode material, while the theoretical capacity of graphite is only 372 mA·h/g, which cannot meet the needs of high energy density lithium ion batteries. Therefore, seeking for alternative anode materials has become a subject of the rapid developed high energy density lithium ion batteries. Among various non-carbon anode materials, crystalline silicon is a very promising anode material for lithium ion batteries. It has a high theoretical capacity (4200 mA·h/g, 9800 mA·h/mL) and a low delithiation voltage (0.37 V vs. $Li/Li^+$). However, the volume change of crystalline silicon during charging and discharging processes can be as high as 310%. Such significant expansion and contraction may cause the existence of large stresses in the material, which may further cause certain problems, for example, the material becomes a powder, the active material is separated from the current collector and thus losing its activity, and the capacity quickly decays. Hence, how to solve the expansion problem and poor cycle performance of silicon-based anode materials becomes one of the focuses of the research on silicon-based anode materials.

In order to solve the aforementioned problems, one of the common solutions is to uniformly coat a layer of carbon on the outside of the silicon particles to obtain a core-shell type silicon-carbon composite material. The presence of the carbon shell reduces the direct contact between the silicon surface and the electrolyte and improves the electronic conduction between the silicon particles, so that the cycle stability of the entire electrode can be greatly improved. In the field of new energy, a carbon deposit layer of a single structure is currently used for coating in this context.

SUMMARY

The present application provides a silicon-based anode material having a surface that has a carbon deposition layer of a structural change and a preparation method thereof, which can improve the electrochemical performance of the silicon-based anode material.

One aspect of the present application provides a method for preparing a silicon-based anode material, comprising: passing a silicon substrate material through a vapor deposition gas to coat a surface of the silicon substrate material with a carbon deposition layer of a certain thickness, wherein the vapor deposition gas includes a first carbon source gas and a second carbon source gas, wherein, volume percentage of the first carbon source gas and the second carbon source gas in the vapor deposition gas increases or decreases at different reaction stages for forming the carbon deposition layer, a side of the carbon deposited layer close to the silicon base material is more or less dense than the other side of the carbon deposited layer.

In some embodiments, the volume percentage of the first carbon source gas and the second carbon source gas in the vapor deposition gas monotonously increases or decreases at different reaction stages for forming the carbon deposition layer.

In some embodiments, the volume percentage of the first carbon source gas and the second carbon source gas in the vapor-deposited gas monotonously increases or decreases in a stepped manner at different reaction stages for forming the carbon deposition layer.

In some embodiments, the first carbon source gas is acetylene, ethylene or a combination thereof, and the second carbon source gas is benzene, toluene or a combination thereof.

In some embodiments, the volume percentage of the first carbon source gas and the second carbon source gas in the vapor deposition gas varies between 0 and 20.

In some embodiments, the volume percentage of the first carbon source gas and the second carbon source gas in the vapor deposition gas monotonously increases or decreases between 0 and 20.

In some embodiments, the volume percentage of the first carbon source gas and the second carbon source gas in the vapor deposition gas decreases in a gradient manner from 5-20 to 0-5, or increases in a gradient manner from 0-5 to 5-20.

In some embodiments, the volume percentage of the first carbon source gas and the second carbon source gas in the vapor deposition gas decreases monotonically through 3 to 15 steps.

In some embodiments, the method is performed in an inert atmosphere, and the volume of the first carbon source gas and the second carbon source gas accounts for 1-30% of the volume percentage of the atmosphere in total.

In some embodiments, the silicon substrate material is selected from the group consisting of a metallurgical silicon, a silicon oxide $SiOx$ ($0 \le x \le 1.5$), a porous silicon and a mixture thereof, and a median diameter of the silicon substrate material ranges from 1 μm to 20 μm.

In some embodiments, the silicon substrate material further includes a compound of the general formula $MSiOy$, wherein $0.85 < y \le 3$; M is any one or more of Li, Na, Mg, Al, Fe and Ca.

In some embodiments, a reaction temperature of the method is 700° C. to 1000° C., and a reaction time thereof is 3 to 12 h.

In some embodiments, a thickness of the carbon deposition layer is 10 nm to 150 nm.

Another aspect of the present application provides a silicon-based anode material, comprising: a silicon substrate material; and a carbon deposition layer, wherein the carbon deposition layer coats the silicon substrate material, the carbon deposition layer is denser on one side thereof close to the silicon substrate material than the other side of the carbon deposition layer.

In some embodiments, the carbon deposition layer monotonously increases or decreases from an inner side thereof to an outer side thereof.

In some embodiments, a density of the carbon deposition layer increases or decreases monotonously through 3 to 15 steps.

In some embodiments, the silicon substrate material is selected from the group consisting of a metallurgical silicon, a silicon oxide $SiOx$ ($0 \le x \le 1.5$), a porous silicon and a mixture thereof, and a median diameter of the silicon substrate material ranges from 1 μm to 20 μm.

In some embodiments, the silicon substrate material further includes a compound of the general formula MSiOy, wherein $0.85<y\leq3$; M is any one or more of Li, Na, Mg, Al, Fe and Ca.

In some embodiments, a thickness of the carbon deposition layer is 10 nm to 150 nm.

Yet another aspect of the present application provides a lithium ion battery, an anode of the lithium ion battery comprises any of the silicon-based anode material as mentioned above.

In view of the deficiencies in the performance of existing silicon-based anode materials, the present application provide the silicon-based anode material and the method for preparing the silicon-based anode material as described in the embodiments of the present application. A chemical vapor deposition approach is used to form a carbon deposition layer with different densities on the surface of silicon material. The portion with a high structural density in the carbon deposition layer has more stable electrochemical cycle performance, while the portion with relatively lower density has better interface conductivity.

Moreover, the chemical vapor deposition process is carried out in a vapor deposition furnace with sections of various temperatures and an atmosphere that can be independently controlled, so that the density of the carbon deposition layer can be increased or decreased as desired.

Moreover, the carbon deposition layer on the surface of the silicon-based anode material has a continuously changing structure, in which the inner deposition layer is tightly coated, which can effectively suppress the volume effect of the silicon-based anode material during charging and discharging and thus improve the interface conductivity. On the other hand, the surface of the outer deposition layer is smooth and dense, which help form a stable SEI (solid electrolyte interphase) film, thereby greatly improving the cycling stability of the material.

In addition, the preparation method for the silicon-based anode material is simple in process, strong in continuity of operation, suitable for large-scale industrial production, and thus has wide application prospects in the field of lithium ion batteries.

Some other features of the present application will be described in the following description. Through the description, the contents in the following drawings and embodiments will become obvious to a person of ordinary skill in the art. The inventive points of the present application will be fully described by practicing or using the methods, means or combinations thereof set forth in the detailed examples discussed below.

BRIEF DESCRIPTION OF THE DRAWINGS

The following FIGURE illustrates in detail the exemplary embodiments disclosed in the present application. The same reference numerals indicate similar structures shown in different FIGURES. A person of ordinary skill in the art will understand that these embodiments are merely exemplary embodiments rather than limiting embodiments. The accompanying drawings are only for the purpose of illustration and description, and are not intended to limit the scope of the present application. Other embodiments may also accomplish the objects of the present application. Moreover, it should be understood that the drawings are not drawn to scale.

FIG. 1 is a schematic structural diagram of a vapor deposition furnace according to some embodiments of the present application.

DETAILED DESCRIPTION

The following description provides specific application scenarios and requirements of the present application in order to enable a person skilled in the art to make and use the present application. Various modifications to the disclosed embodiments will be apparent to a person skilled in the art. The general principles defined herein may be applied to other embodiments and applications without departing from the spirit and scope of the present application. Therefore, the present application is not limited to the embodiments described herein, but the broadest scope consistent with the claims.

The technical solution of the present application will be described in detail below with reference to the embodiments and accompanying drawings.

The present application provides a method for preparing a silicon-based anode material, comprising: passing a silicon substrate material through a vapor deposition gas to coat a surface of the silicon substrate material with a carbon deposition layer of a certain thickness, wherein the vapor deposition gas includes a first carbon source gas and a second carbon source gas, wherein, volume percentage of the first carbon source gas and the second carbon source gas in the vapor deposition gas increases or decreases at different reaction stages for forming the carbon deposition layer, a side of the carbon deposited layer close to the silicon base material is more or less dense than the other side of the carbon deposited layer.

In some embodiments of the present application, by way of the method for preparing the silicon-based anode material, the silicon substrate material can be pulverized into powdery particles, and the powdery particles are then transported to a vapor deposition furnace. The silicon substrate materials can be one or more of metallurgical silicon, silicon oxide SiOx ($0<x\leq1.5$), porous silicon, etc. The median diameter of the silicon substrate material ranges from 1 μm to 20 μm. The silicon substrate material also includes a compound of the general formula MSiOy, where $0.85<y\leq3$; M can be any one or more of Li, Na, Mg, Al, Fe, and Ca.

In the embodiments of the present application, the particle size of the silicon substrate material also has a certain influence on the electrochemical performance of the finally formed silicon-based anode material. As the particle size of the silicon substrate material decreases, and its specific surface area increases, the surface reaction that accompanies the charging and discharging cycles increases, and the formation of SEI film consumes more $Li^+$, which reduce the cycle characteristics and first cycle Coulombic efficiency of the silicon-based anode material. An increase in the particle size of the silicon substrate material can prevent the active material in the electrode from cracking due to charging and discharging, which makes it difficult to generate a new surface. Therefore, the amount of side reactions is reduced, and the cycle performance and first cycle Coulombic efficiency become better.

In the case where a chemical vapor deposition reaction is performed in a vapor deposition furnace, the volume percentage of the first carbon source gas and the second carbon source gas in the vapor deposition gas is highly related to the density of the carbon deposition layer formed. When the volume percentage of the first carbon source gas and the second carbon source gas decreases, the density of the formed carbon deposition layer increases. Thus, the carbon deposition layer can better suppress the expansion effect of the internal core structure, which is beneficial to the improvement of the electrochemical cycle performance of the silicon-based anode material. In addition, the smooth and dense carbon deposition layer can facilitate the formation of a stable SEI film, which helps improve the first cycle Coulombic efficiency. As the volume percentage of the first carbon source gas and the second carbon source gas increases, the density of the formed carbon deposition layer decreases, and the interface conductivity of the carbon deposition layer increases. In some embodiments, the first carbon source gas can be acetylene, ethylene or a combination thereof, and the second carbon source gas can be benzene, toluene or a combination thereof.

In some embodiments of the present application, when the chemical vapor deposition reaction is carried out, the volume percentage of the first carbon source gas and the second carbon source gas may increases or decreases in different reaction stages in order to adjust the density distribution of the formed carbon deposition layer. For example, the volume percentage of the first carbon source gas and the second carbon source gas may be increased in a stage, then decreased in the subsequent stage, and then increased again in the next stage, so that a carbon deposition layer with alternating density distributions may be formed. In the embodiments of the present application, the volume percentage of the first carbon source gas and the second carbon source gas in the vapor deposition gas may increase or decrease within a range of 0-20.

In some embodiments, the volume percentage of the first carbon source gas and the second carbon source gas in the vapor deposition gas monotonously increases or decreases at different reaction stages for forming a carbon deposition layer. That is to say, the volume percentage of the first carbon source gas and the second carbon source gas can be adjusted continuously or intermittently according to the setting, so as to form a carbon deposition layer whose density is continuously increased or discontinuously increased, or carbon deposition layer whose density is continuously decreased or discontinuously decreased. For example, the volume percentage of the first carbon source gas and the second carbon source gas in the vapor deposition gas monotonously increases or decreases between 0-20.

In some embodiments, the volume percentage of the first carbon source gas and the second carbon source gas in the vapor deposition gas increases or decreases in a stepped manner at different reaction stages for forming the carbon deposition layer. As a result, the density of the formed carbon deposition layer also increases or decreases in a stepped manner. For example, the volume percentage of the first carbon source gas and the second carbon source gas in the vapor deposition gas decreases from 5-20 in a gradient manner to 0-5 or increases from 0-5 to 5-20 in a gradient manner. Optionally, in some embodiments, the volume percentage of the first carbon source gas and the second carbon source gas in the vapor deposition gas decreases monotonically through 3 to 15 steps.

The changes in the density of the carbon deposition layer also affect the electrochemical performance of the silicon-based anode material. The changes in the density of the carbon deposition layer cause the carbon deposition layer structure to contain certain sub-structures. The more times the volume percentage of the first carbon source gas and the second carbon source gas change, the more sub-layers are included in the carbon deposition layer structure. As the number of structural sub-layers of the carbon deposition layer increases, the cycle performance of the silicon-based anode material becomes better.

A large change in the volume percentage of the first carbon source gas and the second carbon source gas would result in more significant sub-layered structure formed in the carbon deposition layer. Optionally, the carbon deposition layer structure includes 3 to 15 sub-layers, and the thickness of each sub-layer is the same or similar.

FIG. 1 is a schematic structural view of a vapor deposition furnace according to some embodiments of the present application. As shown in FIG. 1, the silicon substrate material is pulverized into powdery particles, and the powdery particles are then transported through the feeding zone to reach a heating zone in the vapor deposition furnace. The powdery particles are heated to a first temperature in the heating zone, for example, 700° C. to 1000° C. After the heating treatment, the powdery particles are transported to a thermal insulation zone, where the thermal insulation zone further includes n stages of reaction zones with independently controlled atmosphere, as shown in FIG. 1, the first furnace zone, the second furnace zone, the third furnace zone, the fourth furnace zone, the fifth furnace zone, . . . the $n-1^{th}$ furnace zone, $n^{th}$ furnace zone. Different reaction areas correspond to different reaction stages during the forming process of the carbon deposition layer. In some embodiments, the thermal insulation zone may be equally divided into n sections with equal lengths, or may be divided into n sections with unequal lengths. The value of n can be, for example, 3-15.

For each reaction zone, the atmosphere may include a first carbon source gas (corresponding to the carbon source A shown in FIG. 1), a second carbon source gas (corresponding to the carbon source B shown in FIG. 1), and an inert gas. The first carbon source gas may be one or a combination of acetylene and ethylene. The second carbon source gas may be one or a combination of benzene and toluene. The inert gas may be one or a combination of at least two of argon, nitrogen and helium. The total volume of the first carbon source gas and the second carbon source gas accounts for 1-30% of the total volume percentage of the atmosphere.

The volume percentage of the first carbon source gas and the second carbon source gas in the vapor deposition gas increases or decreases at different reaction stages for forming the carbon deposition layer. The volume ratio of the first carbon source gas to the second carbon source gas in the total atmosphere volume of each section of the heat preservation zone is referred to as R, then R would decrease or increase from R1 in the first furnace zone to Rn in the $n^{th}$ furnace zone as required. For example, R1 in the first furnace zone is 19, R2 in the second furnace zone is 17, R3 in the third furnace zone is 14, R4 in the fourth furnace zone is 12, R5 in the fifth furnace zone is 8, and R6 in the sixth furnace zone is 6.

In some embodiments, the volume percentage of the first carbon source gas and the second carbon source gas in the vapor deposition gas may monotonously increase or decreases at different reaction stages for forming a carbon deposition layer. The volume percentage of the first carbon source gas and the second carbon source gas may monotonically increase or decrease between 0-20. For example, R1 in the first furnace zone is 15, R2 in the second furnace zone is 12, R3 in the third furnace zone is 9, R4 in the fourth furnace zone is 6, and so on. For another example, R1 in the first furnace zone is 6, R2 in the second furnace zone is 9. R3 in the third furnace zone is 12, R4 in the fourth furnace zone is 15, and so on.

In some embodiments, the volume percentage of the first carbon source gas and the second carbon source gas in the vapor deposition gas may increase or decrease monotonously in a stepped manner in different reaction stages for forming the carbon deposition layer. The volume percentage of the first carbon source gas and the second carbon source gas may change between 0 and 20, that is, 0<R<20. For example, the volume percentage of the first carbon source gas and the second carbon source gas in the vapor deposition gas may decrease in a gradient manner from 5-20 to 0-5, or increase in a gradient manner from 0-5 to 5-20. In the vapor deposition gas, the volume percentages of the first carbon source gas and the second carbon source gas may decrease monotonically according through 3 to 15 steps. Since the thermal insulation zone can be divided into a plurality of reaction zones (for example, 3 to 15 reaction zones) that can independently control the atmosphere, the volume percentages of the first carbon source gas and the second carbon source gas can be regarded as uniform and unchanged in the same reaction zone, and can increase or decrease monotonously between different reaction areas. For example, R1 in the first furnace zone is 15, R2 in the second furnace zone is 12, R3 in the third furnace zone is 9, R4 in the fourth furnace zone is 6, and so on. For another example, R1 in the first furnace zone is 6, R2 in the second furnace zone is 9, R3 in the third furnace zone is 12, R4 in the fourth furnace zone is 15, and so on.

The temperature of the vapor deposition heat treatment in the thermal insulation zone is from 700° C. to 1000° C., and the treatment time is from 3 to 12 hours. After the powder material is vapor-deposited and coated, the silicon-based anode material with a carbon deposition layer have a surface for changes structure can be obtained after cooling down to room temperature under an inert gas condition. The thickness of the carbon deposition layer can be from 10 nm to 150 nm.

Through the chemical vapor deposition reaction, by means of adjusting the staged atmosphere conditions in the vapor deposition reaction furnace, the present application can control the heat treatment time of the reactants under different atmosphere conditions, and achieve the preparation of a silicon material coated with a carbon deposition layer with structural changes on the surface thereof. The carbon deposition layer is tightly coated, which can effectively suppress the volume effect and conductivity of the silicon-based anode material during the battery charging and discharging processes, and thus greatly improve the cycle stability of the material.

The embodiments of the present application further provide a silicon-based anode material prepared according to the preparation method of a silicon-based anode material as provided by the present application. Since the gas composition changes in a stepped manner during the vapor deposition process, the carbon deposition layer formed will also have structural changes. The silicon-based anode material provided by the present application may include a silicon substrate material and a carbon deposition layer, the carbon deposition layer covers the silicon substrate material, where the side of the carbon deposition layer close to the silicon substrate material is more or less dense than the other side of the carbon deposition layer. The silicon substrate material may include one or more of metallurgical silicon, silicon oxide $SiOx$ ($0 \leq x \leq 1.5$), and porous silicon, and the median diameter of the silicon substrate material ranges from 1 μm to 20 μm.

In some embodiments, the density of the carbon deposition layer may increases or decreases monotonously from an inner side thereof to an outer side thereof. Since the volume percentage of the first carbon source gas and the second carbon source gas in the vapor deposition gas increases or decreases at different reaction stages for forming the carbon deposition layer, the density of the carbon deposition layer formed under different gas volume ratios may also be different. The density of the carbon deposition layer may increase or decrease from the inner side to the outer side as the volume percentage of the first carbon source gas and the second carbon source gas changes.

In some embodiments, the density of the carbon deposition layer may increase or decrease monotonously through 3 to 15 steps. Since the thermal incubation zone can be divided into a plurality of reaction zones (for example, 3 to 15 reaction zones) that can independently control the atmosphere, the volume percentage of the first carbon source gas and the second carbon source gas can be regarded as uniform and unchanged in the same reaction zone, and may increase or decrease monotonously between different reaction areas. The density of the carbon deposition layer formed in the same reaction area can be regarded as approximately unchanged or slightly changed, and the density of the carbon deposition layer formed in different reaction areas can be regarded as having an increasing or decreasing trend.

The present application will be described in more detail in reference to Examples 1 to 6 provided below.

Example 1

(1) Silicon oxide SiO particles are crushed to D50=8 μm by mechanical grinding.

(2) The powder obtained in step (1) is loaded in a vapor deposition furnace for a vapor deposition coating treatment. The thermal insulation zone in the vapor deposition furnace has 12 sections with independently controlled atmosphere, and the atmosphere condition is a mixed gas of argon, ethylene and benzene. Ethylene and benzene are vapor deposition gases, and a total volume of the two vapor deposition gases accounts for 8% of the total gas volume (the total gas volume is the sum of the volumes of argon, ethylene and benzene). Table 1 shows the composition and corresponding R values of the 12 different stages of furnace atmosphere in the thermal insulation zone. The vapor deposition temperature is 950° C., and the axial speed of the material is adjusted so that the time for the powder to pass through the thermal insulation zone is 6 hours. After a sample is vapor-deposited and coated, the temperature is reduced to room temperature under nitrogen to obtain a silicon-based anode material with a carbon deposition layer of continuous structural changes on the surface.

TABLE 1

| Gas content in volume percentage/% | Thermal insulation zone | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Ethylene | 7.50 | 7.50 | 7.50 | 7.50 | 7.38 | 7.20 | 6.86 | 6.00 | 6.00 | 6.00 | 6.00 | 6.00 |
| Benzene | 0.50 | 0.50 | 0.50 | 0.50 | 0.62 | 0.80 | 1.14 | 2.00 | 2.00 | 2.00 | 2.00 | 2.00 |
| R | 15 | 15 | 15 | 15 | 12 | 9 | 6 | 3 | 3 | 3 | 3 | 3 |

Example 2

(1) Silicon oxide SiO particles are crushed to D50=8 μm by mechanical grinding.

(2) The powder obtained in step (1) is loaded in a vapor deposition furnace for a vapor deposition coating treatment. The thermal insulation zone in the vapor deposition furnace has 12 sections with independently controlled atmosphere, and the atmosphere condition is a mixed gas of argon, ethylene and toluene. Ethylene and toluene are vapor deposition gases, and a total volume of the two vapor deposition gases accounts for 10% of the total gas volume. Table 2 shows the composition and corresponding R values of the 12 different stages of furnace atmosphere in the thermal insulation zone. The vapor deposition temperature is 950° C., and the axial speed of the material is adjusted so that the time for the powder to pass through the thermal insulation zone is 6 hours. After a sample is vapor-deposited and coated, the temperature is reduced to room temperature under nitrogen to obtain a silicon-based anode material with a carbon deposition layer of continuous structural changes on the surface.

TABLE 2

| Gas content in volume percentage/% | Thermal insulation zone | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Ethylene | 9.37 | 9.37 | 9.37 | 9.37 | 9.23 | 9.00 | 8.57 | 8.00 | 6.67 | 6.67 | 6.67 | 6.67 |
| Toluene | 0.63 | 0.63 | 0.63 | 0.63 | 0.77 | 1.00 | 1.43 | 2.00 | 3.33 | 3.33 | 3.33 | 3.33 |
| R | 15 | 15 | 15 | 15 | 12 | 9 | 6 | 4 | 2 | 2 | 2 | 2 |

Example 3

(1) Silicon oxide SiO particles are crushed to D50=8 μm by mechanical grinding.

(2) The powder obtained in step (1) is loaded in a vapor deposition furnace for a vapor deposition coating treatment. The thermal insulation zone in the vapor deposition furnace has 12 sections with independently controlled atmosphere, and the atmosphere condition is a mixed gas of argon, acetylene and benzene. Acetylene and benzene are vapor deposition gases, and a total volume of the two vapor deposition gases accounts for 10% of the total gas volume. Table 3 shows the composition and corresponding R values of the 12 different stages of furnace atmosphere in the thermal insulation zone. The vapor deposition temperature is 950° C., and the axial speed of the material is adjusted so that the time for the powder to pass through the thermal insulation zone is 6 hours. After a sample is vapor-deposited and coated, the temperature is reduced to room temperature under nitrogen to obtain a silicon-based anode material with a carbon deposition layer of continuous structural changes on the surface.

TABLE 3

| Gas content in volume percentage/% | Thermal insulation zone | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Acetylene | 9.00 | 9.00 | 9.00 | 9.00 | 8.57 | 8.57 | 7.50 | 7.50 | 6.00 | 6.00 | 6.00 | 6.00 |
| Benzene | 1.00 | 1.00 | 1.00 | 1.00 | 1.43 | 1.43 | 2.50 | 2.50 | 4.00 | 4.00 | 4.00 | 4.00 |
| R | 9 | 9 | 9 | 9 | 6 | 6 | 3 | 3 | 1.5 | 1.5 | 1.5 | 1.5 |

Example 4

(1) Silicon oxide SiO particles are crushed to D50=2.5 μm by mechanical grinding.

(2) The powder obtained in step (1) is loaded in a vapor deposition furnace for a vapor deposition coating treatment. The thermal insulation zone in the vapor deposition furnace has 12 sections with independently controlled atmosphere, and the atmosphere condition is a mixed gas of argon, ethylene and benzene. Ethylene and benzene are vapor deposition gases, and a total volume of the two vapor deposition gases accounts for 16% of the total gas volume. Table 4 shows the composition and corresponding R values of the 12 different stages of furnace atmosphere in the thermal insulation zone. The vapor deposition temperature is 850° C., and the axial speed of the material is adjusted so that the time for the powder to pass through the thermal insulation zone is 6 hours. After a sample is vapor-deposited and coated, the temperature is reduced to room temperature under nitrogen to obtain a silicon-based anode material with a carbon deposition layer of continuous structural changes on the surface.

TABLE 4

| Gas content in volume percentage/% | Thermal insulation zone | | | | | | | | | | | |
| --- | --- | --- | --- | --- | --- | --- | --- | --- | --- | --- | --- | --- |
| | 1 | 2 | 3 | 4 | 5 | 6 | 7 | 8 | 9 | 10 | 11 | 12 |
| Ethylene | 15.00 | 15.00 | 15.00 | 15.00 | 15.00 | 15.00 | 14.77 | 14.40 | 13.71 | 12.00 | 12.00 | 12.00 |
| Benzene | 1.00 | 1.00 | 1.00 | 1.00 | 1.00 | 1.00 | 1.23 | 1.60 | 2.29 | 4.00 | 4.00 | 4.00 |
| R | 15 | 15 | 15 | 15 | 15 | 15 | 12 | 9 | 6 | 3 | 3 | 3 |

Example 5

(1) Silicon oxide SiO particles are crushed to D50=2.5 μm by mechanical grinding.

(2) The powder obtained in step (1) is loaded in a vapor deposition furnace for a vapor deposition coating treatment. The thermal insulation zone in the vapor deposition furnace has 12 sections with independently controlled atmosphere, and the atmosphere condition is a mixed gas of argon, ethylene and benzene. Ethylene and benzene are vapor deposition gases, and a total volume of the two vapor deposition gases accounts for 16% of the total gas volume. Table 5 shows the composition and corresponding R values of the 12 different stages of furnace atmosphere in the thermal insulation zone. The vapor deposition temperature is 850° C., and the axial speed of the material is adjusted so that the time for the powder to pass through the thermal insulation zone is 6 hours. After a sample is vapor-deposited and coated, the temperature is reduced to room temperature under nitrogen to obtain a silicon-based anode material with a carbon deposition layer of continuous structural changes on the surface.

TABLE 5

| Gas content in volume percentage/% | Thermal insulation zone | | | | | | | | | | | |
| --- | --- | --- | --- | --- | --- | --- | --- | --- | --- | --- | --- | --- |
| | 1 | 2 | 3 | 4 | 5 | 6 | 7 | 8 | 9 | 10 | 11 | 12 |
| Ethylene | 15.00 | 15.00 | 15.00 | 15.00 | 15.00 | 15.00 | 14.77 | 14.40 | 13.71 | 12.00 | 12.00 | 12.00 |
| Benzene | 1.00 | 1.00 | 1.00 | 1.00 | 1.00 | 1.00 | 1.23 | 1.60 | 2.29 | 4.00 | 4.00 | 4.00 |
| R | 15 | 15 | 15 | 15 | 9 | 9 | 9 | 9 | 3 | 3 | 3 | 3 |

Example 6

(1) Silicon oxide SiO particles are crushed to D50=2.5 μm by mechanical grinding.

(2) The powder obtained in step (1) is loaded in a vapor deposition furnace for a vapor deposition coating treatment. The thermal insulation zone in the vapor deposition furnace has 12 sections with independently controlled atmosphere, and the atmosphere condition is a mixed gas of argon, acetylene and benzene. Acetylene and benzene. Ethylene and benzene are vapor deposition gases, and a total volume of the two vapor deposition gases accounts for 10% of the total gas volume. Table 6 shows the composition and corresponding R values of the 12 different stages of furnace atmosphere in the thermal insulation zone. The vapor deposition temperature is 850° C., and the axial speed of the material is adjusted so that the time for the powder to pass through the thermal insulation zone is 6 hours. After a sample is vapor-deposited and coated, the temperature is reduced to room temperature under nitrogen to obtain a silicon-based anode material with a carbon deposition layer of continuous structural changes on the surface.

TABLE 6

| Gas content in volume percentage/% | Thermal insulation zone | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Acetylene | 9.00 | 9.00 | 9.00 | 9.00 | 9.00 | 9.00 | 7.50 | 7.50 | 7.50 | 6.00 | 6.00 | 6.00 |
| Benzene | 1.00 | 1.00 | 1.00 | 1.00 | 1.00 | 1.00 | 2.50 | 2.50 | 2.50 | 4.00 | 4.00 | 4.00 |
| R | 9 | 9 | 9 | 9 | 9 | 9 | 3 | 3 | 3 | 1.5 | 1.5 | 1.5 |

The silicon-based anode material samples obtained in the above Examples 1 to 6 are then made into button batteries using a lithium sheet as a counter electrode, and the charge cycle test is next performed. The charge and discharge rate was 0.1 C, and the charge and discharge voltage range is from 0.01 V to 1.50 V. The test results obtained are shown in Table 7 below.

TABLE 7

| Sample | First cycle specific discharge capacity | First cycle Coulombic efficiency | Capacity retention rate after 10 cycles |
|---|---|---|---|
| Example 1 | 1660.1 | 76.3% | 78.4% |
| Example 2 | 1645.4 | 76.7% | 80.9% |
| Example 3 | 1670.3 | 77.5% | 71.5% |
| Example 4 | 1464.3 | 74.6% | 68.8% |
| Example 5 | 1476.8 | 74.3% | 64.7% |
| Example 6 | 1512.4 | 73.5% | 57.6% |

It can be seen from the test data shown in Table 7 that in Examples 1 to 3, the volume percentages of the first carbon source gas and the second carbon source gas decrease sequentially; as a result, the density of the formed carbon deposition layer increases sequentially, and the effect of inhibiting the expansion of the internal core structure is also more significantly in this order, which is beneficial to the improvement of the cycle performance. The smooth and dense carbon deposition layer is beneficial to the formation of a stable SEI film, which is further beneficial to improve the Coulombic efficiency.

Moreover, in Example 2, as the number of sub-layer structures in the carbon deposition layer increases, the cycle performance of the silicon-based anode material becomes better. In Example 3, the volume percentage content of the second carbon source gas benzene accounts for a relatively larger percentage. As a result, a smooth and dense carbon deposition layer is formed, which is beneficial to the formation of an SEI film. Thus, it first cycle Coulombic efficiency has been improved to some extent, but its carbon deposition layer has fewer sub-layer structures, accordingly, its cycle performance is reduced compared to that of Example 2. Compared with Example 2, both the carbon content and the number of sub-layer structures in the carbon deposition layer in Example 1 are slightly lower, accordingly, its capacity is improved, but the cycle number is slightly reduced.

In Examples 5 and 6, the cycle performance of the silicon-based anode material is lower than those of Examples 1 to 3; this is due to the fact that the median diameter of their silicon substrate material particles has been changed. When the median diameter of the anode active material particle is 2.5 μm, the specific surface area increases, so the surface reaction accompanying the charge and discharge cycles increases, and the formation of the SET film would consume more $Li^+$, thereby reducing the cycle characteristics and the first cycle Coulombic efficiency. When the median particle size is 8 μm, it can prevent the active material from cracking during the charging and discharging processes and thus the newly formed new surface is reduced. As a result, the amount of side reactions is reduced, and the cycle performance and first cycle Coulombic efficiency are improved. When comparing Example 5 with Example 6, the number of carbon sub-layer structures in Example 5 is higher than that in Example 6, and thus its cycle performance is better. In Example 6, because the median particle size of the silicon-based material is 2.5 μm, its specific surface area is larger, 10% volume fraction of carbon source coating results in low carbon content, further it has a lower number of carbon sub-layer structures. As a result, it has poorer cycle performance and lower first cycle Coulombic efficiency. However, since its Si/C ratio is higher as compared to Examples 4 and 5, its capacity has been increased accordingly.

In summary, after reading the detailed disclosure provided above, a person skilled in the art will understand that the disclosures are merely some example, and do not limit the present application. Moreover, although not explicitly stated herein, a skilled in the art will understand that the present invention is intended to cover various changes, modifications and improvements of the embodiments. These changes, modifications and improvements are intended to be proposed in the present application and are within the spirit and scope of the exemplary embodiments of the present application.

It will be appreciated by a person of ordinary skill in the art that the term "and/or" used herein includes any and all combinations of one or more of the related items listed.

It will also be appreciated by a person of ordinary skill in the art that the terms "comprise", "comprising". "include"

and/or including, when used herein, refer to the presence of stated features, entities, steps, operations, elements and/or assemblies, but do not exclude the presence or addition of one or more other features, entities, steps, operations, elements, assemblies and/or combinations thereof.

It should also be understood that although the terms "first", "second", "third", etc. may be used herein to describe various elements, these elements may not be limited by these terms. These terms are merely used to distinguish one element from another. Thus, a first element in some embodiments may be referred to as a second element in other embodiments without departing from the teachings of the present application. Moreover, the same reference symbols or reference numerals are used throughout entire disclosure to represent the same elements.

Furthermore, the exemplary embodiments are described by referring to the cross sectional and/or planar illustrations as the idealized exemplary illustration.

What is claimed is:

1. A method for preparing a silicon-based anode material, comprising:
   passing a silicon substrate material through a vapor deposition gas to coat a surface of the silicon substrate material with a carbon deposition layer of a certain thickness, wherein the vapor deposition gas includes a first carbon source gas and a second carbon source gas,
   wherein, a volume percentage of the first carbon source gas and the second carbon source gas in the vapor deposition gas increases or decreases at different reaction stages for forming the carbon deposition layer, a side of the carbon deposited layer close to the silicon base material is more or less dense than the other side of the carbon deposited layer.

2. The method for preparing a silicon-based anode material according to claim 1, characterized in that the volume percentage of the first carbon source gas and the second carbon source gas in the vapor deposition gas monotonously increases or decreases at different reaction stages for forming the carbon deposition layer.

3. The method for preparing a silicon-based anode material according to claim 1, characterized in that the volume percentage of the first carbon source gas and the second carbon source gas in the vapor-deposited gas increases or decreases in a stepped manner at different reaction stages for forming the carbon deposition layer.

4. The method for preparing a silicon-based anode material according to any one of claim 1, characterized in that the first carbon source gas is acetylene, ethylene or a combination thereof, and the second carbon source gas is benzene, toluene or a combination thereof.

5. The method for preparing a silicon-based anode material according to claim 1, characterized in that the volume percentage of the first carbon source gas and the second carbon source gas in the vapor deposition gas varies between 0 and 20.

6. The method for preparing a silicon-based anode material according to claim 1, characterized in that the volume percentage of the first carbon source gas and the second carbon source gas in the vapor deposition gas monotonously increases or decreases between 0 and 20.

7. The method for preparing a silicon-based anode material according to claim 1, characterized in that the volume percentage of the first carbon source gas and the second carbon source gas in the vapor deposition gas decreases in a gradient manner from 5-20 to 0-5, or increases in a gradient manner from 0-5 to 5-20.

8. The method for preparing a silicon-based anode material according to claim 1, characterized in that the volume percentage of the first carbon source gas and the second carbon source gas in the vapor deposition gas decreases monotonically through 3 to 15 steps.

9. The method for preparing a silicon-based anode material according to claim 1, characterized in that the method is performed in an inert atmosphere, and the volume of the first carbon source gas and the second carbon source gas accounts for 1-30% of the volume percentage of the atmosphere in total.

10. The method for preparing a silicon-based anode material according to claim 1, characterized in that the silicon substrate material is selected from the group consisting of a metallurgical silicon, a silicon oxide $SiO_x$ ($0 \leq x \leq 1.5$), a porous silicon and a mixture thereof, and a median diameter of the silicon substrate material ranges from 1 μm to 20 μm.

11. The method for preparing a silicon-based anode material according to claim 10, characterized in that the silicon substrate material further includes a compound of the general formula $MSiO_y$, wherein $0.85 < y \leq 3$; M is any one or more of Li, Na, Mg, Al, Fe and Ca.

12. The method for preparing a silicon-based anode material according to claim 1, characterized in that a reaction temperature of the method is 700° C. to 1000° C., and a reaction time thereof is 3 to 12h.

13. The method for preparing a silicon-based anode material according to claim 1, characterized in that a thickness of the carbon deposition layer is 10 nm to 150 nm.

* * * * *